(12) United States Patent
Nomoto et al.

(10) Patent No.: US 7,660,832 B2
(45) Date of Patent: Feb. 9, 2010

(54) SYSTEM RECOVERY METHOD AND COMPUTER SYSTEM USING THE SAME

(75) Inventors: Toyohiro Nomoto, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 11/638,011

(22) Filed: Dec. 12, 2006

(65) Prior Publication Data

US 2007/0101063 A1    May 3, 2007

Related U.S. Application Data

(63) Continuation of application No. 10/837,549, filed on Apr. 30, 2004, now Pat. No. 7,162,498.

(30) Foreign Application Priority Data

Feb. 27, 2004    (JP)    .............................. 2004-052696

(51) Int. Cl.
G06F 17/30    (2006.01)
(52) U.S. Cl. ...................... 707/202; 707/204; 711/162; 714/2; 714/15; 714/20
(58) Field of Classification Search ...................... 714/2, 714/15, 20, E11.122, E11.124, 6; 711/162; 707/200, 202, 204
See application file for complete search history.

(56) References Cited

U.S. PATENT DOCUMENTS 5,835,953 A    11/1998 Ohran 6,594,744 B1    7/2003 Humlicek et al.

(Continued)

FOREIGN PATENT DOCUMENTS

JP    05-002499 A    1/1993

(Continued)

OTHER PUBLICATIONS

Kroenke "Database Recovery," in Database Processing Fundamentals, Design and Implementation 6th Edition Prentice Hall, Upper Saddle River, NJ, USA, pp. 290-293 (1998).

(Continued)

*Primary Examiner*—Jean M Corrielus
(74) *Attorney, Agent, or Firm*—Townsend and Townsend and Crew LLP

(57) ABSTRACT

A recovery method that uses log takes a long time to recover, and another recovery method that uses backup has the difficulties that if a computer abnormally stops its conversion process due to a failure, the result of the conversion performed up to the time of that abnormal stop couldn't be reflected on the later process for recovery. In a computer system, a system recovery management unit produces backup as the initial status of volume and snapshot taken when the system is operating, by use of a backup restore processing unit of a storage apparatus, and manages the situations of the process by use of a recovery point list/table. When a trouble occurs, it determines a point of recovery from the recovery point list/table, and makes the volume be recovered from the produced backup and the overwriting of meta data in order to keep the data consistency.

8 Claims, 12 Drawing Sheets

U.S. PATENT DOCUMENTS

| | | | |
|---|---|---|---|
| 6,665,815 B1 | 12/2003 | Goldstein et al. | |
| 6,728,736 B2 | 4/2004 | Hostetter et al. | |
| 6,877,016 B1 | 4/2005 | Hart et al. | |
| 7,162,498 B2 * | 1/2007 | Nomoto et al. | 707/202 |
| 2004/0010487 A1 | 1/2004 | Prahlad et al. | |
| 2004/0064784 A1 | 4/2004 | Hayano et al. | |
| 2008/0208931 A1 * | 8/2008 | Van Riel et al. | 707/204 |
| 2008/0250079 A1 * | 10/2008 | Eguchi et al. | 707/202 |

FOREIGN PATENT DOCUMENTS

| | | |
|---|---|---|
| JP | 10-040123 A | 2/1998 |
| JP | 2003-280963 A | 10/2003 |

OTHER PUBLICATIONS

Japan Patent Office (JPO) office action for JPO patent application JP2004-052696 (Jul. 22, 2009).

Japan Patent Office (JPO) office action for JPO patent application JP2004-052696 (Nov. 4, 2009).

* cited by examiner

FIG. 10B

| STATUS # | BATCH STATUS | | |
| --- | --- | --- | --- |
| | DEPARTMENT SUMMARY PRODUCING BATCH | COMPANY BACKGROUND SUMMARY PRODUCING BATCH | ... |
| 0 | EXECUTION START 0 LINE | EXECUTION START 0 LINE | ... |
| 1 | UNDER EXECUTION<br>INPUT ①5000 LINES<br>SORT ①5000 LINES<br>LOAD ①5000 LINES | UNDER EXECUTION<br>INPUT ①16000 LINES<br>INTEGRATION ①5800 LINES<br>LOAD ①0 LINE | ... |
| 2 | NORMAL END<br>INPUT ①5000 LINES<br>SORT ①5000 LINES<br>LOAD ①5000 LINES | UNDER EXECUTION<br>INPUT ①20000 LINES: END<br>INTEGRATION ①20000 LINES: END<br>LOAD ①3200 LINES | ... |
| 3 | NORMAL END<br>INPUT ①5000 LINES<br>SORT ①5000 LINES<br>LOAD ①5000 LINES | UNDER EXECUTION<br>INPUT ①,<br>INTEGRATION ①:END<br>LOAD ①8000 CASES | ... |
| 4 | NORMAL END | OCCURENCE OF FAIL | |
| ... | | | |

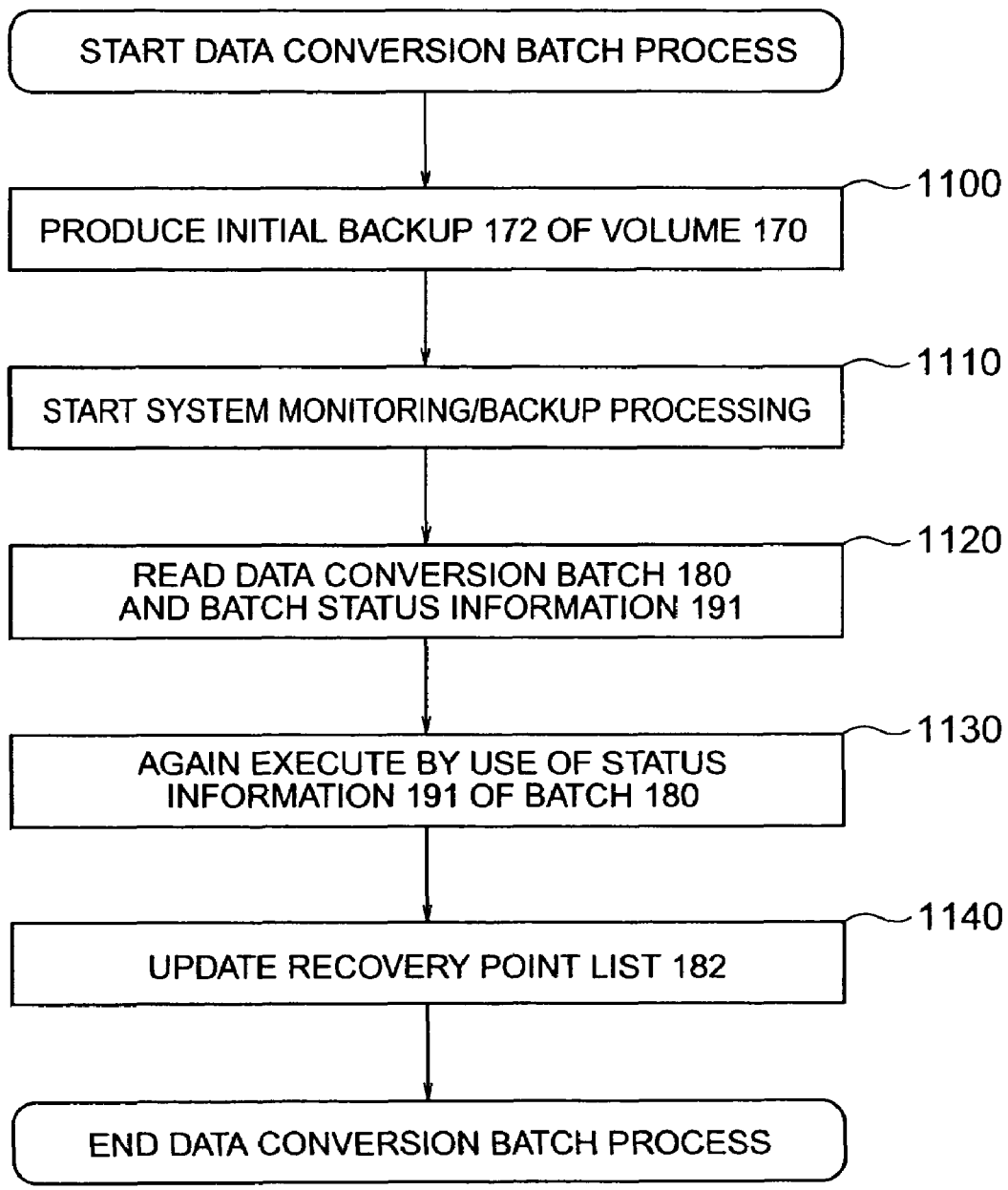

SYSTEM RECOVERY METHOD AND COMPUTER SYSTEM USING THE SAME

INCORPORATION BY REFERENCE

The present application claims priority from Japanese application JP2004-052696 filed on Feb. 27, 2004, the content of which is hereby incorporated by reference into this application.

BACKGROUND OF THE INVENTION

The present invention generally relates to a storage apparatus for storing database and a computer system for managing the storage apparatus, and particularly to a recovery method for the operation of recovering the tables used in the database.

A large-scale information processing system employs database in order to effectively manage the data used in the information processing system. In general, the database has a plurality of tables, and the information processing system converts these tables into tables with aimed data (this process is hereinafter called "table conversion") by executing a program (hereinafter, referred to as "data conversion batches" or "data conversion jobs"), and uses the tables obtained after the conversion.

At this time, a computer for executing the data conversion batches in the information processing system acquires data that constitutes a table from a storage apparatus in which the data is stored. Then, the computer makes the table conversion and writes the converted table into the storage apparatus. In this case, the converted table is stored in a particular storage region (hereinafter, referred to as "volume") of the storage apparatus for each application of that table.

If the computer, which is executing the data conversion batches for the data conversion, abnormally ends, stops or intermits this process, the data of the table on which the computer is making the conversion process causes a mismatch or inconsistency, which leads to the inconsistency of data of the whole information processing system. In this case, the information processing system is required to restore the data of this inconsistent table to its original data, or the state in which the table is not converted yet, and again to execute the table conversion.

In order to make the above data-restoring process, the system administrator has so far ordered the computer, for managing tables, to execute a program (hereinafter, also called "database management system (DBMS)" to produce converted tables, at which time the execution history (hereinafter, referred as "log") can also be acquired in advance. In the event that a trouble occurred, the computer utilized this log to restore the table (for example, see "Database Processing", written by D. M. Kroenke, 1996, p. 524).

In another method, the system administrator previously produces in the storage apparatus the copy (hereinafter, called "backup") of the volume in which the table not converted yet is stored, and uses the backup of the volume, when a trouble occurs, to restore the original table, so that the failed or inconsistent table can be swiftly restored to the initial state.

The conventional methods have the following drawbacks.

The recovery method using only the log, because it causes the computer to produce the log while making the table conversion, is obliged to apply the additional load for taking the log on the computer, with the result that the table conversion process couldn't be speeded up. In addition, when the failed table is restored to the original state, the computer processes the data of the table one after another on the basis of the log data from the start to recover, and thus it takes a long time to restore so that it is difficult to recover fast.

In the recovery method using the backup, because it acquires the backup before the table conversion is performed, it is difficult for the system administrator to restore the data of the failed table to the most recent state, or the state in which the recovered data can reflect the process executed just before the abnormal stop due to a failure in the computer.

SUMMARY OF THE INVENTION

Accordingly, it is an object of the invention to provide a system recovery method that, when a trouble occurs in a system, can fast restore the system to the most recent state.

We consider the following configuration as one embodiment of the invention, that is, a computer system having a computer and a storage apparatus. In this computer system, the computer orders the storage apparatus to take the backup of data before the data conversion batches are executed by a data conversion batch execution program and to produce at each time of finishing a batch the snapshot of the volume having a related table stored therein.

At this time, the computer records the time point when the backup or snapshot has been acquired, as a point of recovery. If a trouble occurs during the execution of the batches, the computer system recovers wholly a volume by use of the backup or snapshot written at a specified point of recovery. In addition, the computer system acquires meta data from the backup volume produced before the batch group is executed, specifies, on the basis of the acquired meta data, the tables of portions related to a batch in which the trouble has occurred and to the batches that are being executed at that time, and overwrites those portions. Or the computer system uses the status information of batches described on the recovery point list/table and the log to specify data of a portion related to the batch in which the failure has occurred and batches that are being executed at that time, makes consistency verification, and overwrites those portions by using the log.

At this time, the meta data indicates where those tables are stored on the database system, and it may include the data itself of the tables.

According to the invention, the system can be fast to the most recent state.

Other objects, features and advantages of the invention will become apparent from the following description of the embodiments of the invention taken in conjunction with the accompanying drawings.

BRIEF DESCRIPTION OF THE DRAWINGS

FIGS. 10A and 10B are diagrams showing an example of user interface and recovery point list/table.

FIG. 11 is a flowchart showing an example of the procedure for resuming data conversion batches.

DESCRIPTION OF THE EMBODIMENTS

Embodiments of the invention will be described in detail. This invention is not limited to the embodiments that will be described later, but also includes other configurations equal to the following embodiments.

Figure 1:
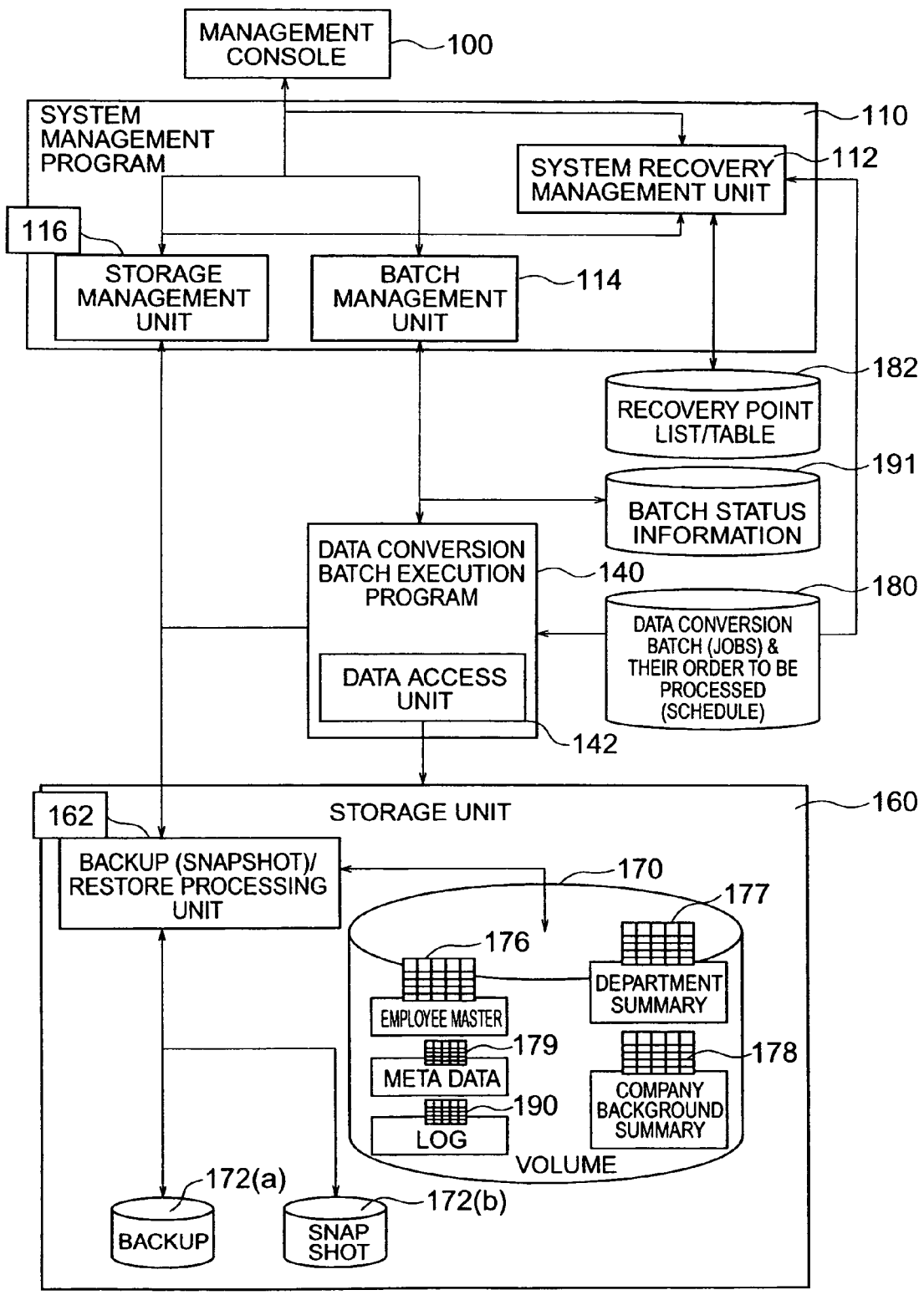
FIG. 1 is a block diagram of an example of the logic configuration of the computer system.

FIG. 1 is a block diagram of an example of the program and data structures of the first embodiment 1. As illustrated in FIG. 1, we will describe as an example the case where the same volume of a storage apparatus stores a summary table for each department and a summary table for each company background produced by converting an employee's master table in which the member data of a certain company is stored.

Each of the constituent elements that will be described below is a program, and executed by a computer or the computing portion of the storage apparatus. However, some of the following constituent elements may be achieved by a dedicated hardware.

Referring to FIG. 1, there is shown a management console 100 for the operation of a system management program 110. The system management program 110 has a batch management unit 114, a storage management unit 116 and a system recovery management unit 112 for managing these programs. The system recovery management unit 112 makes the process associated with a recovery point list/table 182. The recovery point list/table 182 will be mentioned later.

A data conversion batch execution program 140 reads out data conversion batches (jobs) & their order to be processed (schedule) (hereinafter, referred to as "data conversion batches 180"), and uses a data access unit 142 to process the data of the tables stored in a volume 170 on a storage apparatus 160. The data accessing unit 142 is responsive to the order from the system recovery management unit 112 to edit meta data 179 stored in the volume 170 and the data stored in a backup or snapshot volume 172.

A backup (snapshot)/restore processing unit 162 of the storage apparatus 160 produces the backup or snapshot 172 as the backup of volume 170, and recovers, or restores the volume 170 from the backup or snapshot 172. The volume 170 has stored therein an employee master table 176, a department summary table 177, a company-background summary table 178 and the meta data 179 associated with these tables. Each of the tables 176, 177, 178 is not limited to a single one, but may be an arbitrary number of sub tables more than 1. The table 176 as the original for the data conversion is not necessarily stored in the same volume as the converted tables 177, 178. The number of volumes may be 1 or more, or arbitrary.

Figure 2:
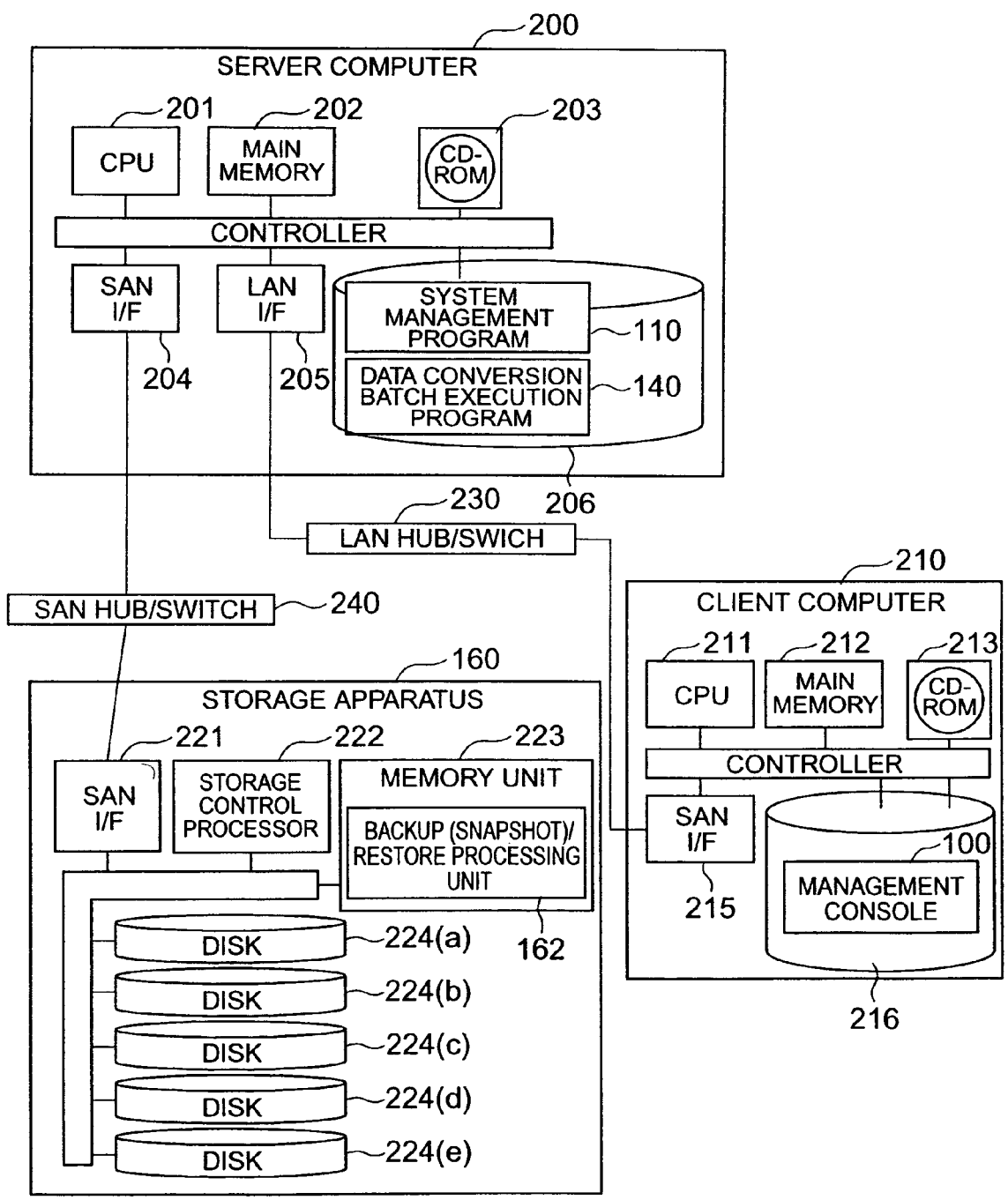
FIG. 2 is a block diagram of an example of the hardware structure of the computer system.

FIG. 2 is a block diagram showing an example of the configuration of a computer system of this embodiment.

This computer system has a server computer 200, a client computer 210 and the storage apparatus 160.

The server computer 200 and client computer 210 are interconnected through a LAN hub (or switch) 230 and a cable. The LAN hub (or switch) 230 and a network sometimes collectively mean LAN. The network that connects the server computer 200 and client computer 210 is not necessarily LAN.

The server computer 200 and storage apparatus 160 are interconnected through a SAN hub (or switch) 240 and a network. The SAN hub (or switch) 240 and the network sometimes collectively mean SAN (Storage Area Network). The network that connects the server computer 200 and storage apparatus 160 is not necessarily SAN.

The server computer 200 executes the system management program 110 and data conversion batch execution program 140 shown in FIG. 1. The server computer 200 has a CPU 201, a main memory 202, a CD-ROM drive unit 203, a SAN I/F 204, a LAN I/F 205 and a disk drive unit 206. A controller interconnects these elements.

The disk drive unit 206 stores the programs of system management program 110 and data conversion batch execution program 140, data conversion batches 180 and data of recovery point list/table 182 shown in FIG. 1. The CPU 201 loads these programs into the main memory 202, and executes them.

These programs and data may be stored in disk drive units 224(a), 224(b), 224(c), 224(d) and 224(e) of the storage apparatus 160. In addition, these programs and data may be stored in a disk drive unit 216 of the client computer 210.

The user or system administrator operates the client computer 210 to order, or send a command to the server computer 200. The client computer 210 has a CPU 211, a main memory 212, a CD-ROM drive unit 213, a LAN I/F 215, the disk drive unit 216 and a controller for interconnecting those devices.

The disk drive unit 216 of client computer 210 stores the management console (program) 100. The user or system administrator operates the client computer 210 to execute the management console 100, thereby ordering the server computer 200 to execute the system management program 110 and data conversion batch execution program 140.

The storage apparatus 160 has a SAN I/F 221, a storage control processor 222, a memory unit 223, the disk drive units 224(a), 224(b), 224(c), 224(d) and 224(e) and a controller for interconnecting these devices. The disk drive units 224 store the volumes 170, 172. The volumes and the disk drive units have a relation of n-to-n correspondence. Specifically, the volumes respectively correspond to part of or all of the physical storage regions that the disk drive units 224 have. Therefore, one volume consists of one or a plurality of storage regions in which one or a plurality of disk drive units 224 have.

The backup (snapshot)/restore processing unit 162 is a program that is stored in the memory unit 223 and executed by the storage control processor 222 that the server computer 200 orders to execute.

While this embodiment has the server computer 200 and client computer 210, a single computer may replace those computers. In addition, each of the server computer 200 and client computer 210 may be consist of a plurality of computers. While the storage apparatus 160 is single in this embodiment, it may be formed of a plurality of storage apparatuss connected.

First, the flow of the processes in the computer system of this embodiment will be briefly described. When the term "a program" takes the subject of a sentence in the later description, it means that a hardware device storing the program executes a process. In the following examples, the data conversion batches are assumed to be a program of a plurality of batches (department summary, company background summary and so on) that are to be executed in parallel.

First, the system administrator orders the server computer 200 via the client computer 210 to execute the processes of table conversion (hereinafter, called "table conversion batches" or simply "batches"). The system recovery management unit 112 that has received the command produces the backup of the volumes of which contents have not converted by batches yet. Then, the data conversion batch execution program 140 activates the batch for the department summary, the batch for the company background summary and the other batches, and causes those batches to be executed in parallel.

Here, the backup indicates a process to copy all the data stored in a volume into another volume. On the other hand, the snapshot is unlike the backup, but the process showing to the host apparatus as if the data virtually stored in a volume were instantly copied into another volume. Here, "virtually" means that, for example, only the difference data to the backup data is copied, and "instantly" means that, for example, the copy operation can be made faster than the backup.

This process for the snapshot includes several types. For example, in a method the same data is previously stored in a plurality of volumes, and at the time of snapshot process, one of the multiple volumes is supplied as a copy of a certain volume to other apparatus. In another method, a plurality of conversion batches are prepared for the access to the volumes, and one of those batches is used for the snapshot. In another method, the contents of a conversion table for the snapshot are changed in order that when data of a volume is updated after the snapshot process, the data not updated yet can be accessed to by previously storing it in another storage region before it is updated.

In still another method, the conversion batches for the snapshot is not changed, but the contents of the normally used conversion tables are changed (that is, they are changed in order that, when data is updated, the changed data that is then stored in another storage region can be accessed to).

Thereafter, when the batch for producing the department summary, for example, is normally finished, the system recovery management unit generates the snapshot of volumes. In this case, the other batches may be continuously executed or intermitted. After the snapshot of volumes is started to generate or completed to produce, the data conversion batch execution program 140 causes the intermitted batch for company background or other batches to be executed in parallel.

Then, it is assumed that an accident occurs such that, for example, the batch for company background summary abnormally ends, while the other batches are still executed. In this case, the system recovery management unit 112 stops all batches that have been executed so far, and restores such that the volumes shown after the department summary has normally been produced and before the batches for the company background summary and the other tables are executed can be restored from the data stored in the snapshot after the production of the department summary and the data backed up before the execution of the batches.

After the recovery, the system administrator orders the server computer 200 to again execute the batches. The system recovery management unit 112 is responsive to this order to similarly produce the backup of the volumes shown before the execution of the batches, activates the batch for the company background summary and the other batches (stopped batches), and again executes the those batches.

Figure 5:
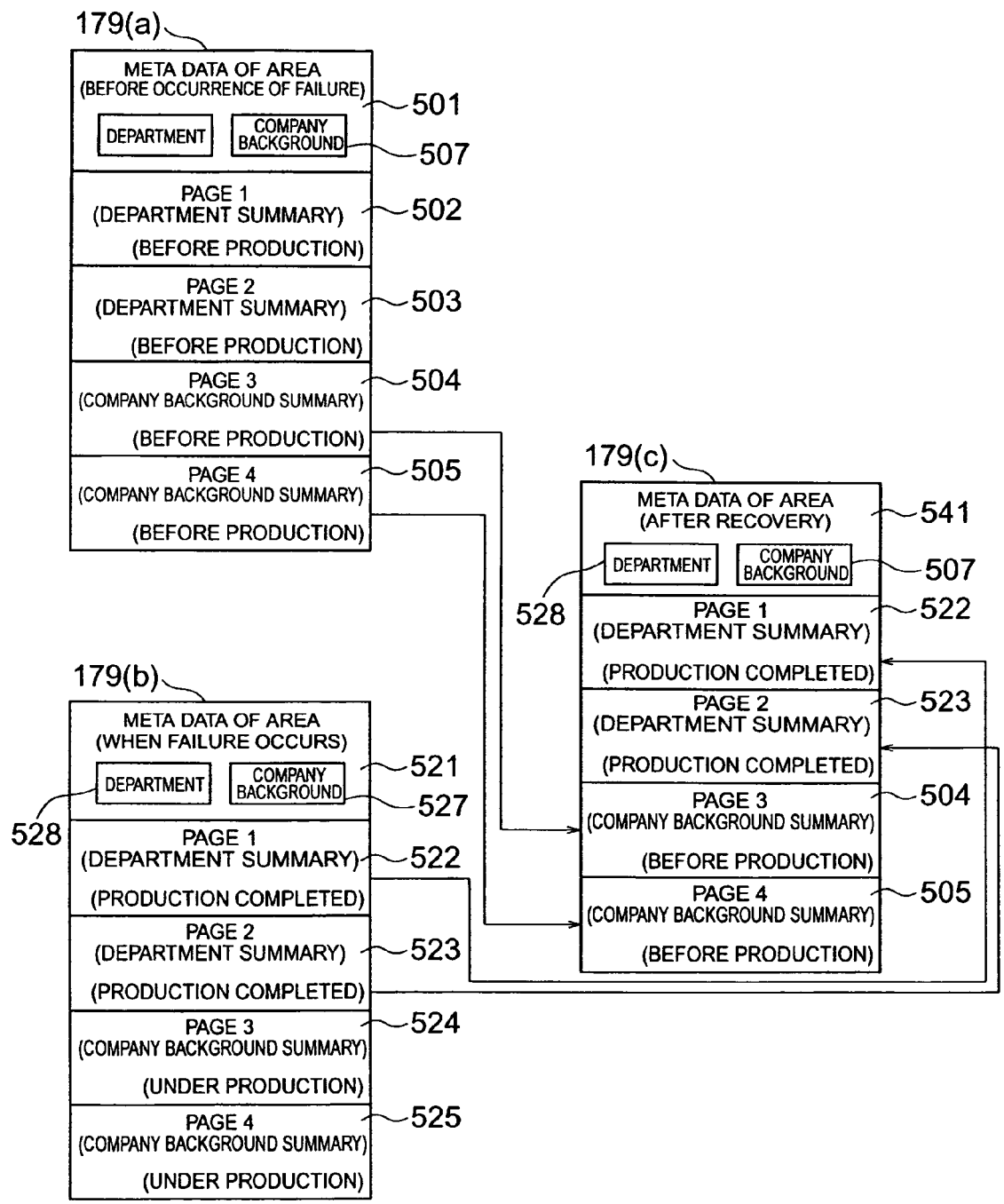
FIG. 5 is a diagram showing an example of meta data.

FIG. 5 shows examples of the contents of meta data 179. The meta data 179 is the information prepared to manage the data stored in the volume 170. The meta data 179 has a header portion 501, pages 502, 503 associated with the department summary 177, and pages 504, 505 associated with the company background summary table 178. While it also has information of other tables, they will not be described here. The meta data 179 includes information necessary for the DBMS to manage the tables. The meta data 179 may include data themselves that constitute the tables.

The header portion 501 includes management information associated with the physical or logical positions, on the disk drive units, of the pages 502, 503, 504 and 505. The meta data 179(*a*) is an example of meta data 179 in the case where the backup of volume 170 that is produced before the department summary 177 and company background summary 178 are produced is stored in the volume 172(*a*). This meta data 179(*a*) is stored in the volume 172(*a*).

The meta data 179(*b*) is an example of meta data 179 in the case where the snapshot of volume 170 produced when the department summary 177 is completely produced and the company background summary 178 is being produced is stored in the volume 172(*b*). This meta data 179(*b*) is stored in the volume 172(*b*). The meta data 179(*b*) is different from the meta data 179(*a*) in that the data portion associated with the tables that are being produced is updated and that the data portion associated with the company background summary and department summary of the header portion 501 and data portions 502 through 505 of pages 1 through 4 are overwritten (as shown at 521~525).

The meta data 179(*c*) is an example of meta data 179 stored in the volume 170 after the system is recovered from a trouble that occurs during the production of company background summary 178.

Figure 6:
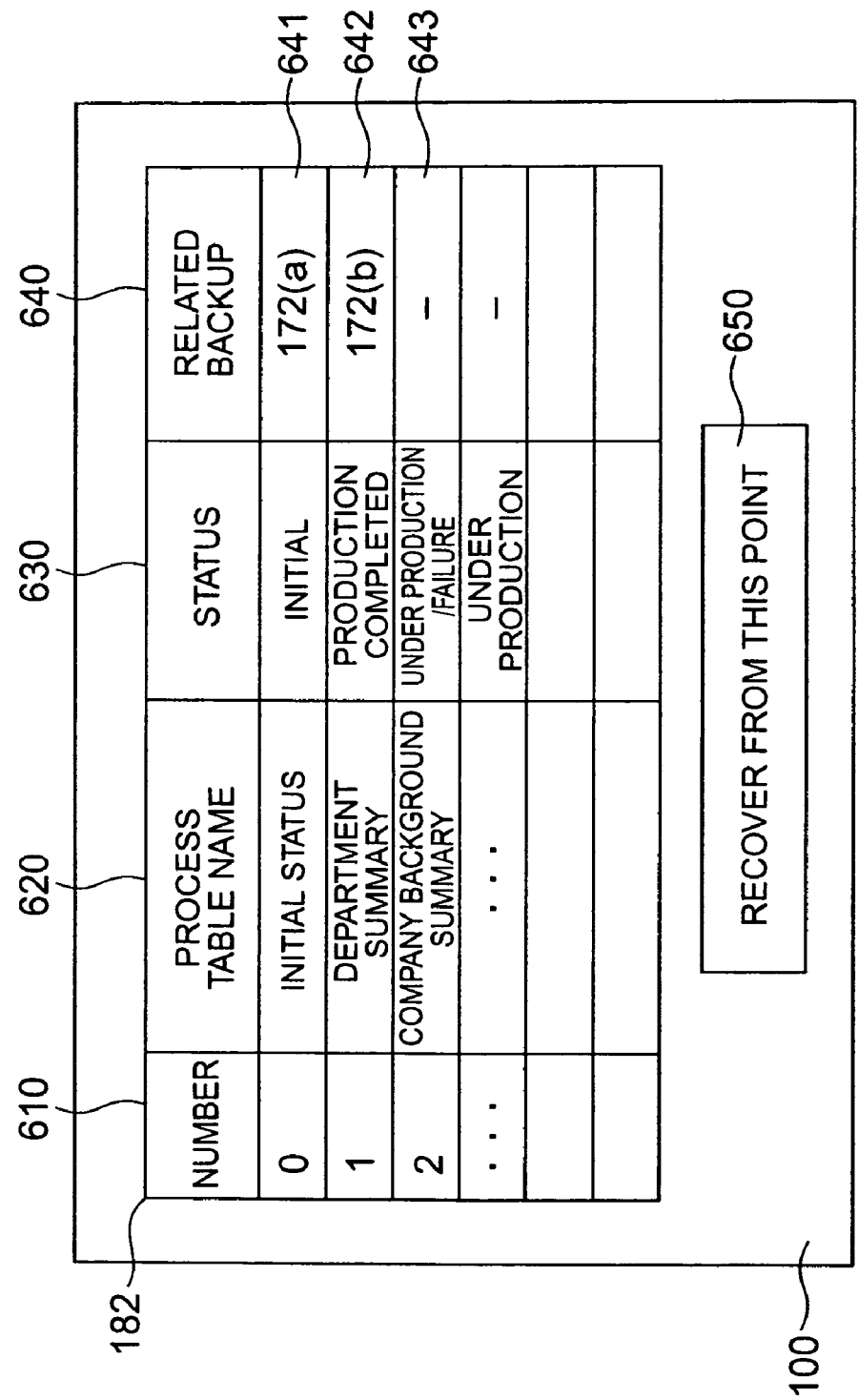
FIG. 6 is a diagram showing an example of user interface and recovery point list/table.

FIG. 6 shows an example of the user interface displayed on the display screen of the client computer 210. The management console 100 causes the information of recovery point list/table 182 to be displayed on the display screen. The recovery point list/table 182 is the information showing the time points at which data can be recovered in the computer system. The system administrator can recover the data of the computer system up to the states shown at the time points of the recovery point list/table.

The recovery point list/table 182 holds the information necessary for a plurality of time points to be specified where data can be recovered, and this information is held in a form of list or table. This recovery point list/table 182 is stored in a storage medium that the server computer 200 (or client computer 210) has. We will describe the recovery point list/table 182 that holds data in a form of table.

The recovery point list/table 182 has records the number of which corresponds to that of tables produced in the database. Each record has a sequential number 610, a process table name 620, a status 630 and related backup 640 in a row of fields. The column or field of sequential number 610 has registered therein the information showing the order in which the tables are produced. In this case, when multiple tables are produced in parallel, arbitrary numbers are assigned to these tables, and those tables are then freshly given numbers in the order of being finished. The backup of the volumes that are not converted yet for table conversion is given number "0" in this embodiment.

The process table name field 620 has registered therein the information showing the tables that are to be converted, or table names (department summary and so on) in this embodiment. The status field 630 has stored therein the information showing if the corresponding table is finished to convert or if it is intermitted due to the occurrence of a trouble.

The backup field 640 has stored therein the information for specifying the volume 172 for backup (hereinafter, referred to as "backup 172") that holds the backup produced before each table is started to convert or the snapshot produced when each table is finished to convert. In this embodiment, since the backup 172 of the volume 170 is 172(*a*) in the initial state, or before all the tables are started to convert, information of backup 172(*a*) is registered in the field of backup 640 at record 641.

The order of records is such that, as described above, each time the table conversion is finished, the tables are freshly given numbers in the order of having faster finished as the first finished one is numbered 1 and the currently converted one numbered 2. The information registered in the status 630 and backup 640 are updated in accordance with the relocation.

The management console 100 makes the contents registered in the recovery point list/table 182 be displayed on the display screen as shown in FIG. 6. At the time of recovery from failure, the system administrator selects a point of recovery from a plurality of records while viewing the screen, and specifies by pushing a recovery button 650 shown on the screen by use of a pointing device or the like. The management console 100 is responsive to the information of the point of recovery selected by the system administrator to order the server computer 200 to restore the computer system to the data status shown at the specified point.

The procedure of executing the data conversion batches in this embodiment will be described below.

Figure 7:
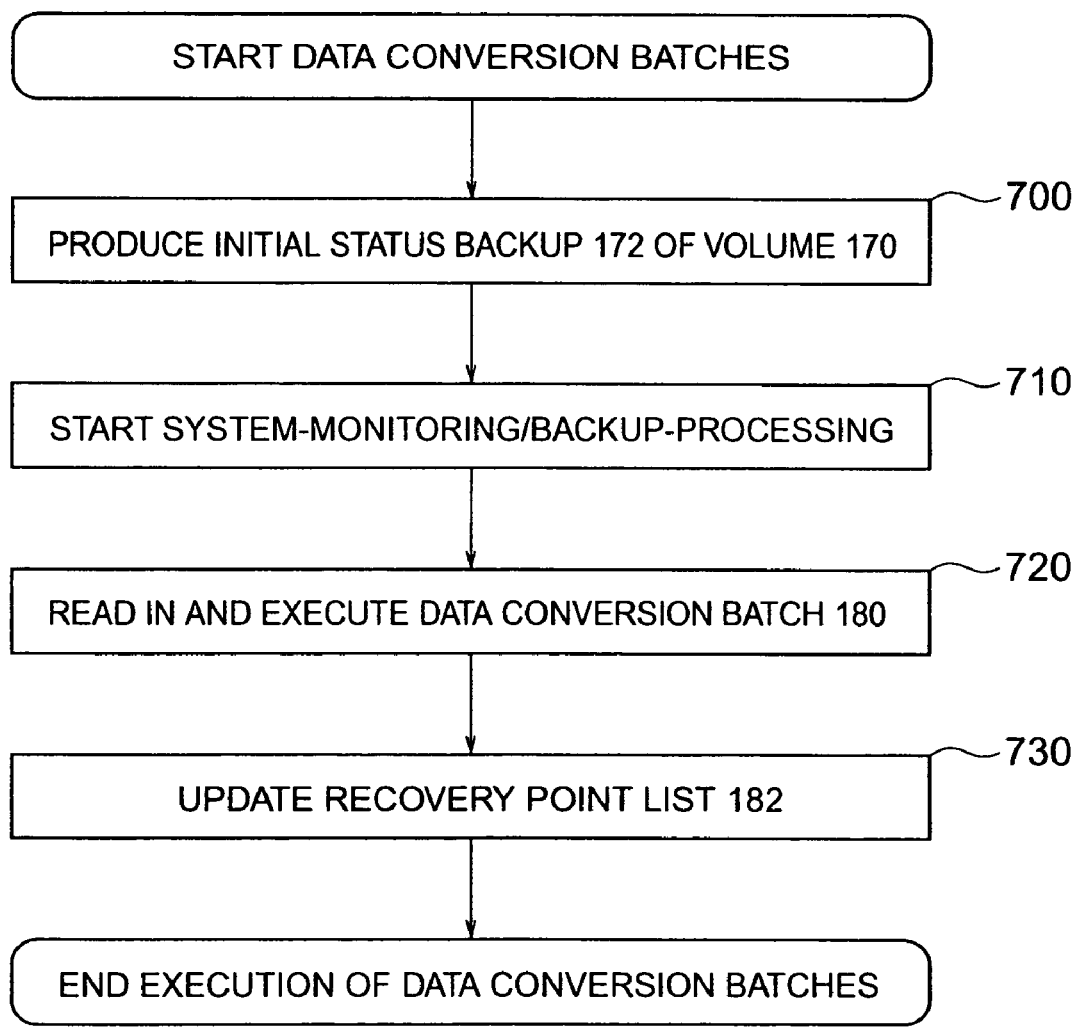
FIG. 7 is a flowchart showing an example of the procedure for starting data conversion batches.

FIG. 7 is a flowchart of an example of processing when the data conversion batches are executed in this embodiment. In this embodiment, it is assumed that multiple batches for table conversion are executed in parallel.

First, the system administrator orders the server computer 200 to start the data conversion batches. The system recovery management unit 112 of the server computer 200 orders the backup (snapshot)/restore processing unit 162 through the storage management unit 116 to produce the backup 172 (a) of volume 170 before the data conversion batches are started to execute. The backup (snapshot)/restore processing unit 162 produces the backup 172(a) of volume 170. At this time, the meta data 179 is also held in the backup 172(a) (step 700).

The system management program 110 causes the batch management unit 114 to receive the execution status of each batch from the data conversion batch execution program 140, thus starting to monitor the execution status of each data conversion batch (step 710). The data conversion batch execution program 140 reads in the data conversion batch 180 and starts to process the data conversion batch of each table on the basis of the defined contents. The data conversion batch execution program 140 also informs the batch management unit 114 of the execution status of each batch (step 720).

The system recovery management unit 112 produces the records (records 641, 642 and 643 in this embodiment) corresponding to the tables to be produced, and writes them in the recovery point list/table 182 on the basis of the backup results from the backup (snapshot)/restore processing unit 162 and the batch execution status fed to the batch management unit 114 from the data conversion batch execution program 140. In addition, the system recovery management unit 112 adds information of "backup 172(a)" in the field 640 at record 641, and "under production" (indicating that the batch is being executed) in the status 630 at records 642 and 643, thus updating the recovery point list/table 182 (step 730).

Figure 3:
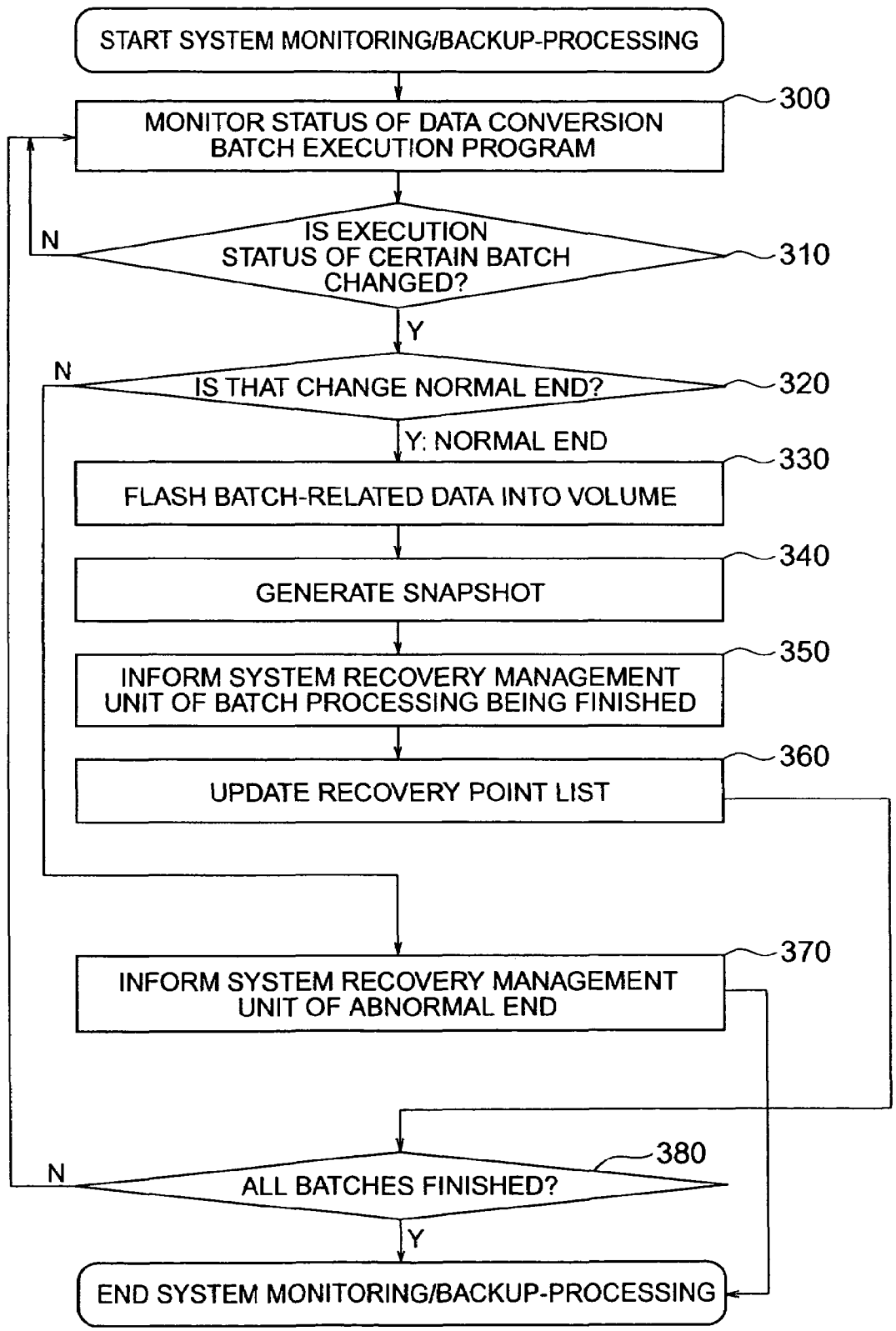
FIG. 3 is a flowchart showing an example of the procedure for producing backup.

FIG. 3 is a flowchart of the backup process 710 showing that the data conversion batches are being executed in the computer system.

When the data conversion batch execution program 140 starts to execute the data conversion batches, the batch management unit 114 receives the execution status of each batch from the data conversion batch execution program 140, thus monitoring the batch execution status of data conversion batches (step 300).

The data conversion batch execution program 140 detects the change of the execution status of a batch for producing a certain table, or in this embodiment, the department summary 177 (step 310). If this change is normal end (step 320), the program 140 orders the storage management unit 116 to completely write data of department summary 177 from the computer in the volume 170 in which the department summary have not written yet (step 330).

Then, the system recovery management unit 112 orders the backup (snapshot)/restore processing unit 162 to generate the snapshot 172(b) of volume 170 in which the department summary 177 is already written. The backup restore processing unit 162 generates the snapshot 172(b) of volume 170 in which the department summary 177 is already written. At this time, the meta data 179 is also written within the snapshot 172(b) (step 340).

The data conversion batch program 140, when a certain data conversion batch normally ends, orders the batch management unit 114 to inform the system recovery management unit 112 of the fact that the batch for producing the department summary 177 has ended (step 350). The system recovery management unit 112 writes, "production completed" in the status 630 at record 642 associated with the department summary 177, of recovery point list/table 182, and sorts the records of recovery point list/table 182. Specifically, the system recovery management unit 112 locates the record 642 under the record 641 of the batch that was finished first (or under the record of another batch that was finished just previously) (step 360).

Thereafter, the program 140 detects the change of the execution status of the batch for producing a certain table, in this embodiment, the company background summary 178 (step 310). If this change is found not to be normal end, or to be abnormally stopped (step 320), the program 140 informs the system recovery management unit 112 through the batch management unit 114 about the fact that the batch for producing the company background summary 178 has abnormally ended (step 370).

The batch management unit 114 informed as above stops the other batchs that are being executed, and also stops the monitoring of batches. At this time, the system recovery management unit 112 writes "failure" in the status of record 643, associated with the company background summary 178, of recovery point list/table 182, and sorts the records. Then, since this batch has (abnormally) ended, it is located under the record 642 of which the batch is already completed.

After the process of step 360, if all batches are not completed yet (step 380), the batch management unit 114 continues to monitor the status of the data conversion batch execution program (step 300). If all batches are found to be completed (step 380), the batch management unit 114 stops monitoring batches.

The procedure of recovering table data in the system of this embodiment will be described below.

Figure 4:
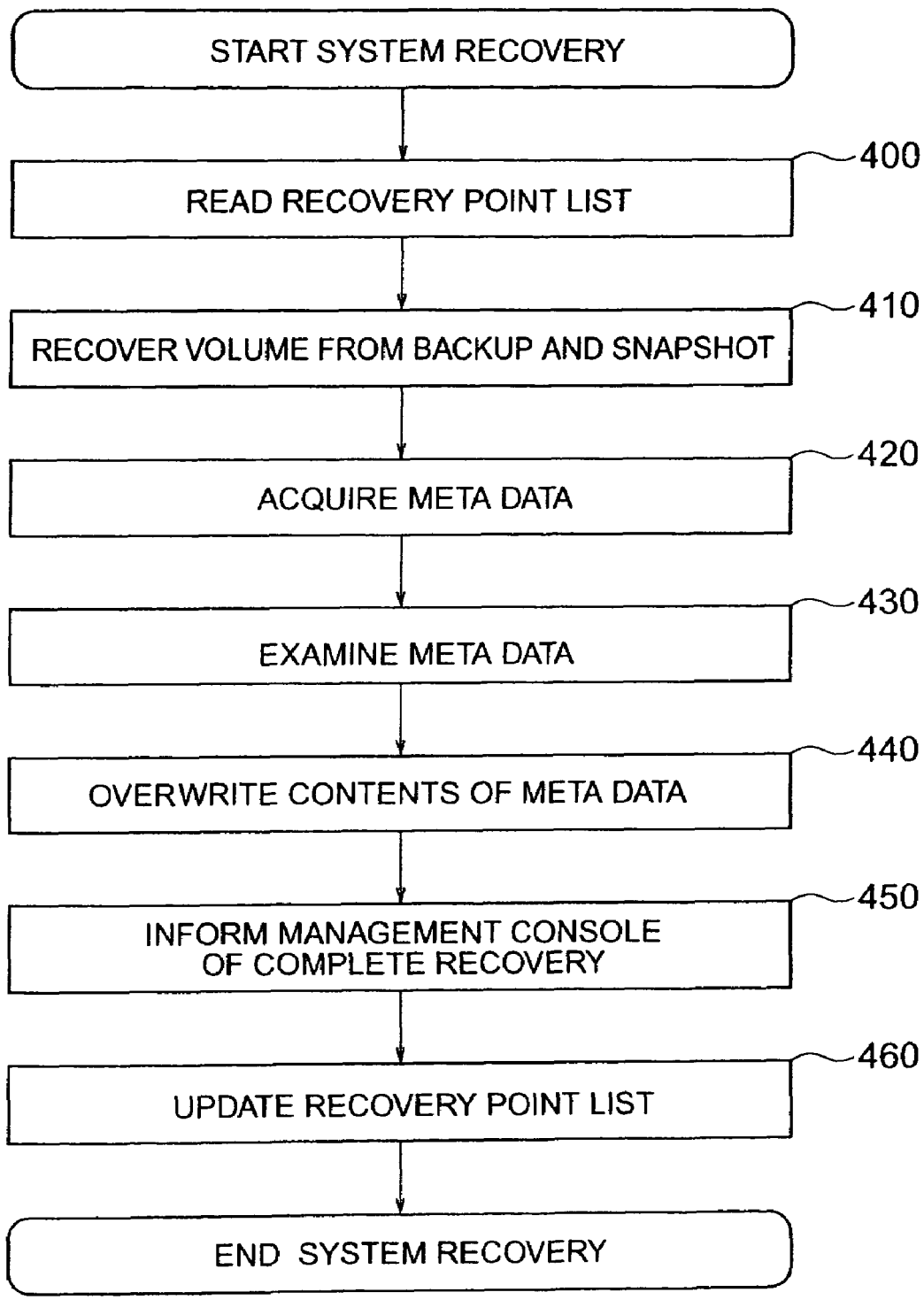
FIG. 4 is a flowchart showing an example of the procedure for recovering data.

FIG. 4 is a flowchart of the recovering process to be executed when the computer system stops due to the occurrence of a failure.

The management console 100 of client computer 210 orders the system recovery management unit 112 of server computer 200 to read out the information of recovery point list/table 182, and offers it to the system administrator. The system administrator selects a desired point of recovery from the recovery point list/table displayed, and specifies it by pushing the recovery button 650 of management console 100 by a pointing device or the like.

The management console 100, when recognizing the pushing of the button by the system administrator, transmits the selected point of recovery information and a command to start the recovery process to the system recovery management unit 112. The system recovery management unit 112 starts to recover on the basis of the information received from the console 100.

In this embodiment, it is assumed that the computer system is stopped when the department summary 177 is normally finished but when the company background summary 178 experiences a trouble and is not normally produced yet. Therefore, the system administrator must consider a recovery point at which the department summary 177 is normally completed and the company background summary 178 is to be restored to the initial state, and thus selects the record 642 at which the department summary is completely produced.

The system administrator can decide as above by viewing the status of recovery point list/table 182. Particularly, since the recovery point list/table 182 has the records arranged in the order of tables produced faster, the system administrator can understand easily which table has most recently been completed. The system administrator does not necessarily recover up to the table produced just before, but may select one before that table (step 400).

The system recovery management unit 112 that has started the recovery process first recovers the volume 170 on the basis of the data of snapshot 172(b) produced when the record 642 is updated. Specifically, the volume produced as snapshot 172(b) replaces the volume 170. Alternatively, the old data held at the snapshot 172(b) is written over the volume 170. At this time, the meta data 179 stored in the volume 170 is meta data 179(b) (step 410).

Subsequently, the system recovery management unit 112 acquires through the data access unit 142 the meta data 179(b) that has been restored into the volume 170, and the meta data 179(a) that is stored in backup 172(a) of the initial status in which the batches are not processed yet (step 420). Then, the system recovery unit 112 examines the obtained meta data 179(a) and (b) to find the portion associated with the table (company background summary 178 in this embodiment) that experienced a failure during the production, or specifically it discriminates the positions at which the data 507 within the header 501, and pages 504 and 505, of meta data 179(a) are written, and similarly the positions at which the data 527 within the header 520, and pages 524 and 525, of meta data 179(b) are written (step 430).

In this case, the pages 527, 524 and 525 shown in meta data 179(b) that is stored in volume 170 have no data consistency kept due to the occurrence of a failure during the production of table company background summary 178. Therefore, in order that only the company background summary 178 can be restored to the status in which the data conversion batch is not executed yet, the system recovery management unit 112 changes through the data access unit 142 the contents of items 527, 524 and 525 of meta data 179(b) that has been recovered into volume 170 in such a manner that, by overwriting, they can be respectively replaced by the contents of items 507, 504 and 505 of meta data 179(a) that is stored in the initial-state backup 172(a) (step 440).

An example of the record of meta data 179 after the completion of step 440 is shown in FIG. 5 at 179(c). At this time, if this table, or company background summary table is a blank table, the meta data portion may be deleted without overwriting.

By this operation, it is possible that the department summary 177 is kept at the meta data produced after the completion, or specifically at items 528, 522 and 523 of meta data 179(b), but the company background summary 178 is modified to the meta data before the production of summary 178, or specifically to the items 507, 504 and 505. After the completion of this operation, the system recovery management unit 112 updates the information about the company background summary and the information about the batch of which the status is "under execution" (step 460) of the recovery point list/table, and sends a notice of having completed the recovery process to the management console 100.

The system administrator informed of the completion notice orders the server computer 200 to again start the data conversion batches. The data conversion batch execution program is responsive to this order to find the batches that do not completely produce tables yet from the information of recovery point list/table, and starts to again execute those batches (again execute from the start). Thereafter, similarly the system recovery management unit 112 orders the backup (snapshot)/restore processing unit 162 to produce, through the storage management unit 116, the backup 172(a) of volume 170 that corresponds to the status in which the batches are not executed.

The backup (snapshot)/restore processing unit 162 produces the backup 172(a) of volume 170. However, the volume 170 at this time includes completed data of the department summary 177 (step 700). Then, the server computer 200 continues to execute the batches shown in FIG. 7.

This first embodiment is effective for a system in which a processing time of batches or jobs is a relatively shorter. A second embodiment, which will be described later, can be applied to a system in which a processing time of batches or jobs is a relatively longer. In this second embodiment, the precision with which data is recovered can be further improved.

In the first embodiment, when a table conversion batch abnormally ends, the other table conversion batches intermitted once are again executed from the first. However, a table conversion process that normally takes a long time further increases the time to be taken when the table conversion is again made. Thus, the second embodiment considers this aspect, that is, it again executes the once intermitted table conversion process from the time at which the conversion process was stopped because of a failure.

In the second embodiment, most parts of the configuration are the same as in the first embodiment. However, in order that the batches once intermitted can be resumed to execute from the stage at which the process was stopped, the server computer 200 acquires and holds status information 191 about the batches (the information for use in grasping the situations in which the batches are executed), and a log 190 about the batches. Thus, the second embodiment is different from the first embodiment in that point. The status information 191 is stored in the main memory 202. Only the portions different from the first embodiment will be described below.

In this embodiment, the log 190 is stored in the volume 170 shown in FIG. 1 in addition to the configuration of the first embodiment. In this case, the log is the log produced in DBMS. The information about operation of data such as writing in DB is stored in time-series manner with processing time. DBMS can make rollback and roll forward of tables by using the log. The log 190 is also stored in the backup 172(a) and snapshot 172(b). The log 190 may be stored not in this storage apparatus but another storage apparatus. The status information 191 may be stored in volume 170.

The flow of processes in this embodiment will first be described. When the system administrator orders to execute the data conversion batches, the system recovery management unit 112 generates the backup of the volume 170 that is kept in the state before the execution of batches. Then, the data conversion batch execution program 140 boots the batch for department summary, the batch for company background summary and other batches, and executes those batches in parallel.

Subsequently, the system recovery management unit 112 records the execution status of batches as status information 191 at previously specified intervals of time or at commit or at the end of each batch, and produces the snapshot of volume 170. Then, the management unit 112 updates the recovery point list/table, and causes the data conversion batch execution program 140 to record the status information of batches. Thereafter, the data conversion batch execution program 140 continuously executes the running batches in parallel.

It is assumed that after the normal end of, for example, the batch for department summary, the batch for producing the company background summary abnormally ends, but the other batches are still executed. The system recovery management unit 112 stops all the batches, and uses an arbitrary backup or snapshot taken after the production of the department summary to restore the volume to the backup acquisition time point at which the department summary is normally produced and the company background summary and the other tables are being produced.

At this time, the system recovery management unit 112 recovers the volume by the log 190 stored in the previously specified backup or snapshot or in the other volumes so that the company background summary under execution and the other batches can keep the data consistency of the tables that are being produced.

After the recovery, the system administrator orders to again execute the batches. The system recovery management unit 112 is responsive to this order to similarly produce the initial-status backup before the execution, and it boots the batch for company background summary and the other batches, and executes them. At this time, by using the status information of batches recorded at the time of backup production, the batches can be started to execute from the midstream of process corresponding to the time at which the backup of the batch was produced.

Figure 10A:
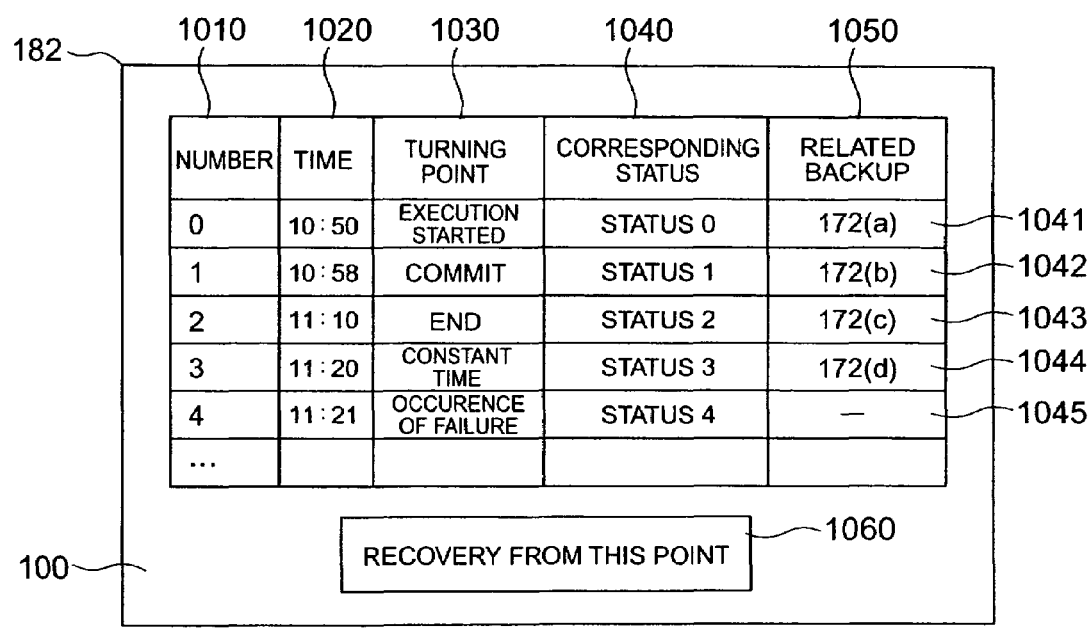

FIGS. 10A and 10B show an example of the user interface displayed on the display screen of the client computer 210. The management console 100 causes the information of recovery point list/table 182 to be displayed on the screen.

Each of the records of recovery point list/table 182 has fields of time 1020, turning point 1030 and corresponding status 1040 in place of the fields 620 and 630 shown in the first embodiment. The recovery point list/table 182 in this embodiment, unlike the first embodiment, has a record for each backup or snapshot acquired. Therefore, data can be precisely recovered. In addition, the execution of data conversion batches that take a long time to execute is not necessary to be restarted from the beginning.

In the field of time 1020 is registered the information about the acquisition time at which the backup or snapshot was acquired. In the field of turning point 1030 is registered the information about the turning point (such as start of execution, commit, end and constant time) at which the backup or snapshot was obtained.

In the field of corresponding status 1040 is registered the information about status number corresponding to batch status 1070. FIGS. 10A and 10B also show at the lower area an example of a sub table of recovery point list/table 182 displayed on the screen.

This sub table has records given for status numbers, respectively, that are registered in the corresponding status 1040 of recovery point list/table 182. Each record has the field 1040 in which the corresponding status number is registered and the field 1070 in which the information about the batch status described by the corresponding status number is registered.

Specifically, the field 1070 has registered therein information (status information 191) about the executed process line number, the executed process status such as "under execution", "execution finished" and "before execution", and the batch execution status of an intermediate file to be used at the time of execution, of each conversion process step included within each of the batches for producing various tables.

While the recovery point list/table 182 and its sub table are separately managed in this embodiment, these tables may take a single table form or a plurality of further divided tables.

The management console 100 makes the contents registered in recovery point list/table 182 be displayed on the display screen as shown in FIGS. 10A and 10B. For the recovery operation from a failure, the system administrator selects a point of recovery from a plurality of records while viewing the display screen, and specifies it by pushing the recovery button 1060 on the screen by use of a pointing device or the like. The management console 100 is responsive to the information of recovery point list/table selected by the administrator to restore the computer system to the data status corresponding to the specified point.

The procedure of the data conversion batches in this embodiment will be described below.

The process flow at the time of starting the batch execution is the same as that (see FIG. 7) described about the first embodiment.

However, in step 730, the system recovery management unit 112 writes the record showing the start of the execution (record 1041 in this embodiment) in the recovery point list/table 182 on the basis of the backup result from the backup (snapshot)/restore processing unit 162 and the batch execution status sent from the data conversion batch execution program 140 to the batch management unit 114. The system recovery. management unit 112 adds the start time to the field 1020 of record 1041, "execution start time" to the turning point 1030 thereof and the information of "execution start: 0 line" to the field of each batch of the status 1070, thus updating the recovery point list/table 182.

Figure 8:
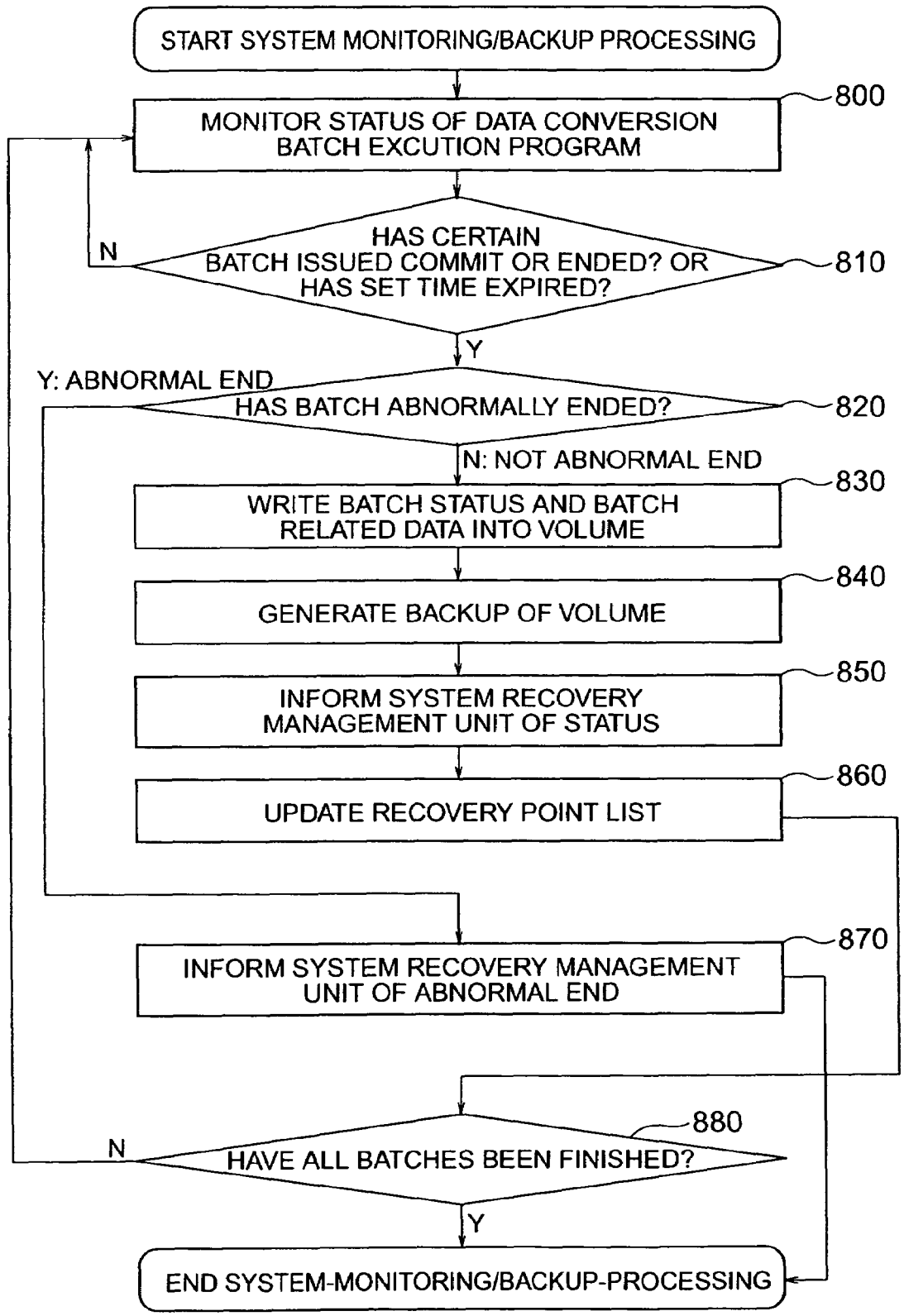
FIG. 8 is a flowchart showing an example of the procedure for producing backup.

FIG. 8 is a flowchart of the backup process in the computer system that is executing the data conversion batches in this embodiment.

When the data conversion batch execution program 140 starts to execute the data conversion batches, the batch management unit 114 receives the execution status of each batch from the data conversion batch execution program 140 to thereby monitor the execution status of the data conversion batches. At this time, the batch management unit 114 also acquires the status information 191 of each batch as needed (step 800).

The data conversion batch execution program 140 detects the issue of commit from a certain batch, the change of execution status or that the set time has expired (810). If the status change is found not to be abnormal end, or if it is detected to be issue of commit from a certain batch, normal end or expiration of set time (step 820), the data conversion batch execution program 140 forces the storage management unit 116 to completely write from the computer the status information of batches already acquired at the time of step 810 and the data of the running batch that is not written in the volume yet thus the data consistency being kept (step 830).

Then, the system recovery management unit 112 orders the backup (snapshot)/restore processing unit 162 to produce the snapshot 172 of the volume 170 that keeps the present status. If the status change detected in step 810 is commit, the snapshot 172(b) is produced. The backup (snapshot)/restore processing unit 162, when ordered as above, produces the snapshot 172(b) of volume 170 (step 840). That is, the snapshot (c), snapshot (d) . . . are produced in accordance with the status change indicated by the turning point 1020.

Subsequently, the data conversion batch program 140 informs the system recovery management unit 112 of the current status of each batch through the batch management unit 114 (step 850). The system recovery management unit 112 that has received the notice of present status adds a record (record 1042 shown in FIGS. 10A and 10B when the produced volume 172 is snapshot 172(b)) to the recovery point list/table 182, and updates the status associated with each batch of batch status 1070 (step 860).

In step 820, if the status change is end of batch, the record 1043 is added. If the status change is lapse of set time in this step, the record 1044 is added. At this time, the backup/snapshot producing time recorded in the field of time 1020 of recovery point list/table 182 needs to be synchronized with the time recorded in the log 190.

If the status change detected by the data conversion batch execution program 140 is abnormal end (step 820), the program 140 informs the system recovery management unit 112 of the fact that the data conversion batch processing has abnormally ended via the batch management unit 114 (step 870). Subsequently, the batch management unit 114 stops all running batches, and stops the process from monitoring the batches.

At this time, the system recovery management unit 112 adds the record 1045 to the recovery point list/table 182, and writes "stop due to failure" in the status blank of the company background summary producing batch of batch status 1070 because the corresponding batch has abnormally ended. Then, the batch management unit 114 stops the batch monitoring process.

The procedure for recovering table data in the computer system of this embodiment will be described below.

Figure 9:
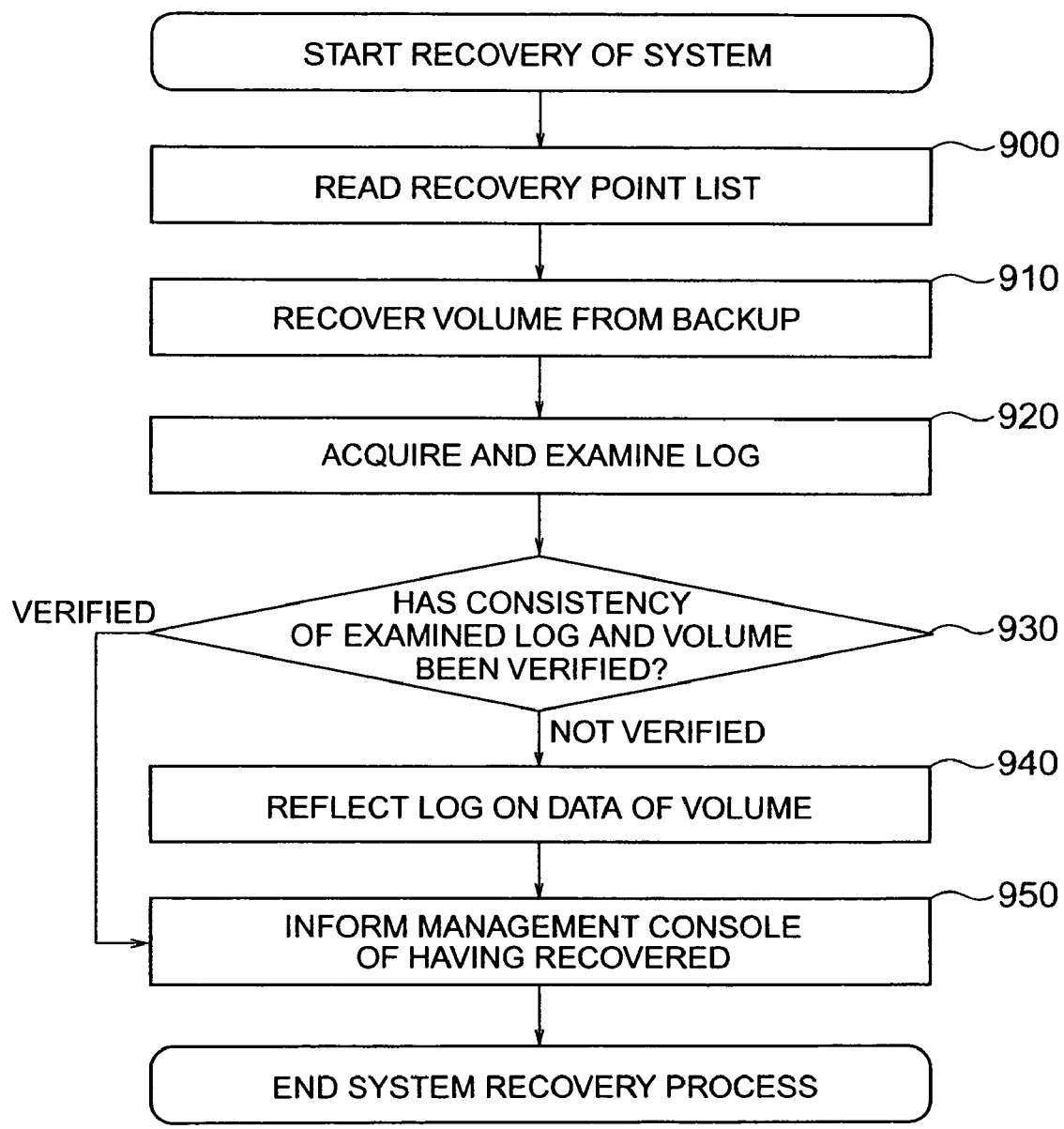
FIG. 9 is a flowchart showing an example of the procedure for recovering data.

FIG. 9 is a flowchart of the recovery process taken when the computer system stops due to the occurrence of a failure.

The management console 100 orders the system recovery management unit 112 to read out the recovery point list/table 182, and make it be displayed for the system administrator. The system administrator selects a desired point of recovery from the recovery point list/table displayed, and specifies it by pushing the recovery button 1060 of management console 100 by a pointing device or the like.

The management console 100, in response to this administrator's operation, sends the selected recovery point list/table information and a command to start the recovery process to the system recovery management unit 112. The system recovery management unit 112 starts recovering on the basis of the information received from the management console 100.

In this embodiment, it is assumed that the system is stopped under the condition that the department summary 177 is normally completed to produce, but the company background summary 178 is not normally produced due to the occurrence of a failure. Therefore, the system administrator considers the point of recovery at which the department summary 177 is normally completed and the company background summary 178 should be restored to the most recent status in the course of the production, and selects record 1044 that is the most recent status after the department summary is completely produced (step 900).

The system recovery management unit 112 that has started to recover first recovers volume 170 on the basis of the data of backup 172(d) produced at the updating time of record 1044 (step 910).

Then, the system recovery management unit 112 acquires the log 190 from the snapshot 172(d) (or other volume) corresponding to the selected record 1044. In addition, the management unit 112 extracts the history that was recorded in the log 190 just before and after the time recorded in the backup acquisition time 1020 of the selected record 1044. Specifically, the management unit 112 selects the entry of the log that was recorded before the backup acquisition time on the basis of the field time 1020 of the selected record 1044 and the information registered in the batch status 1070 (step 920). Subsequently, the management unit 112 verifies the data consistency by comparing the table data within the recovered volume 170 and the contents of the selected portion of log 190 on the basis of the selected history of the log (step 930).

Thereafter, in the case where the data consistency is not maintained, the system recovery management unit 112, if the log is not reflected on the table data, makes roll forward process so that the history within the log can be reflected on the data of volume 170 (step 940).

By this operation, it is possible that, data of the department summary 177 is kept as it is after the completion of the production, and data of the company background summary 178 is restored to the batch status 1070 of recovery point list/table 1044 in the course of the production. After the end of this operation or if the data consistency is maintained, the management unit 112 informs the management console 100 of having finished the recovery process (step 950).

The procedure for resuming the execution of the batches in the system of this embodiment will be described below.

FIG. 11 is a flowchart of the process for resuming the batch execution from the accident in which the computer system was stopped due to the occurrence of a failure in the data conversion batches.

The system administrator who has confirmed the end of the recovery operation orders the server computer 200 to resume the data conversion batches. The system recovery management unit 112, in response to this order, orders the backup (snapshot)/restore processing unit 162 to produce the backup 172(a) of the volume 170 of which the status is before the batch execution through the storage management unit 116.

The backup (snapshot)/restore processing unit 162 produces the backup 172(a) of volume 170. However, the volume 170 at this time includes data of department summary 177 of which the status is already completed, and data of the company background summary 178 of which the status is in the course of the production (step 1100).

Then, the system recovery management unit 112 starts the system monitoring/backup process of (step 800 and the following) (step 1110).

Subsequently, the data conversion batch execution program 140 reads out the data conversion batch 180 and batch status information 191 from the main memory 202 (step 1120). Then, the program 140 determines the execution status of data conversion batch 180 from the batch status recorded in the batch status information 191, and resumes the batch execution from the midstream (the point of recovery) (step 1130).

Thereafter, the program 140 notifies the batch management unit 114 of the status information about the start of each batch, the execution process line number of each conversion step within each batch for producing a table, the execution status such as "under execution", "end of execution" and "before execution" and execution status of batches such as intermediate files used at the time of execution. The batch management unit 114 sends the contents of the notice to the system recovery management unit 112. The management unit 112 adds a new record to the recovery point list/table 182 on the basis of the notice contents, and updates each field (step 1140).

The methods shown in the description about the first and second embodiments are not exclusive to each other, but may be combined with each other. In other words, it is possible to use of the combination of the recovery by the meta data in the first embodiment and the recovery by the log in the second embodiment.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system comprising:
a server computer;
a client computer; and
a storage apparatus connected to the server computer, the storage apparatus having a database stored in a plurality of volumes, wherein the plurality of volumes respectively correspond to part or all of the physical storage regions of the database;
wherein the server computer is configured to execute the processes of table conversion stored in the database, wherein each time the table conversion is finished, the tables are given fresh numbers in the order of being completed;
wherein the sewer computer is farther configured to produce a snapshot of the plurality of volumes included in the plurality of tables each time any one of the plurality of tables is finished in conversion of the any one of the plurality of tables, wherein the storage apparatus includes a copy volume to store copy data, at a first time point, of the volume in which the database is stored; and
wherein the server computer orders the storage apparatus to produce a backup, after the first time point, of the volume including the plurality of tables when any one of the conversion table ends normally; and
when any one of the conversion tables stops abnormally:
the server computer orders the storage apparatus
(i) to overwrite a volume of the storage apparatus, in which the database at a time of the abnormal end of conversion is stored, with a snapshot selected from among the plurality of snapshots which corresponds to a latest snapshot obtained at the time of the abnormal end of conversion,
(ii) to specify data corresponding to the abnormally stopped table from the selected snapshot and overwrite the volume, in which the overwritten volume is stored in
(i), with the specified data corresponding to the abnormally stopped table to recover contents of the abnormally stopped table, wherein the specified data corresponding to the abnormally stopped table is determined based on states of execution associated with the conversion process performed on the abnormally stopped table.

2. The computer system according to claim 1 wherein the backup of the volume including the plurality of tables is performed by a backup process executing concurrently with conversion of the plurality of tables in the database.

3. The computer system according to claim 1 wherein when conversion of any one of the plurality of tables is abnormally stopped, the server computer sends a third command to the storage apparatus to overwrite the volume in which the plurality of tables are stored with the selected snapshot, wherein the storage apparatus, in response to receiving the third command, overwrites the volume in which the plurality of tables are stored with the selected snapshot.

4. The computer system according to claim 1 wherein server computer resumes conversion of the plurality of tables in the database using the specified data corresponding to the abnormally stopped table.

5. A computer system comprising:
a server computer;
a client computer; and
a storage apparatus connected to the server computer, the storage apparatus having a database stored in a plurality of volumes, wherein the plurality of volumes respectively correspond to part or all of the physical storage regions of the database;
wherein the server computer is configured to execute the processes of table conversion stored in the database, wherein each time the table conversion is finished, the tables are given fresh numbers in the order of being completed,
wherein the server computer is further configured to produce a snapshot of the plurality of volumes included in the plurality of tables each time any one of the plurality of tables is finished in conversion of the any one of the plurality of tables,
wherein the storage apparatus includes a copy volume to store copy data, at a first time point, of the volume in which the database is stored;
wherein the server computer orders the storage apparatus to produce a backup, after the first time point, of the volume including the plurality of tables when any one of the conversion table ends normally; and
when any one of the conversion tables stops abnormally:
the server computer orders the storage apparatus
(i) to overwrite at least a metadata portion of a volume of the storage apparatus, in which the database at a time of the abnormal end of conversion is stored, with metadata contained in a snapshot selected from among the plurality of snapshots which corresponds to a latest snapshot obtained at the time of the abnormal end of conversion, and
(ii) to specify data corresponding to the abnormally stopped table from the selected snapshot and overwrite the volume, in which the overwritten volume is stored in (i), with the specified data corresponding to the abnormally stopped table to recover contents of the abnormally stopped table.

6. The computer system according to claim 5 wherein the backup of the volume including the plurality of tables is performed by a backup process executing concurrently with conversion of the plurality of tables in the database.

7. The computer system according to claim 5 wherein when conversion of any one of the plurality of tables is abnormally stopped, the server computer sends a third command to the storage apparatus to overwrite the metadata portion of the volume in which the plurality of tables are stored with the metadata contained in the selected snapshot, wherein the storage apparatus, in response to receiving the third command, accordingly overwrites the metadata portion of the volume in which the plurality of tables are stored.

8. The computer system according to claim 5 wherein server computer resumes conversion of the plurality of tables in the database using the specified data corresponding to the abnormally stopped table.

* * * * *